(12) United States Patent
Mirafzal

(10) Patent No.: US 10,707,791 B2
(45) Date of Patent: Jul. 7, 2020

(54) DIRECT-DRIVE WIND TURBINE CIRCUIT TOPOLOGY WITH SINGLE-STAGE BOOST INVERTER

(71) Applicant: Kansas State University Research Foundation, Manhattan, KS (US)

(72) Inventor: Behrooz Mirafzal, Manhattan, KS (US)

(73) Assignee: Kansas State University Research Foundation, Manhattan, KS (US)

( * ) Notice: Subject to any disclaimer, the term of this patent is extended or adjusted under 35 U.S.C. 154(b) by 239 days.

(21) Appl. No.: 15/527,852

(22) PCT Filed: Nov. 18, 2015

(86) PCT No.: PCT/US2015/061313
§ 371 (c)(1),
(2) Date: May 18, 2017

(87) PCT Pub. No.: WO2016/081586
PCT Pub. Date: May 26, 2016

(65) Prior Publication Data
US 2018/0351491 A1 Dec. 6, 2018

Related U.S. Application Data

(60) Provisional application No. 62/081,098, filed on Nov. 18, 2014.

(51) Int. Cl.
*H02P 9/00* (2006.01)
*H02P 9/30* (2006.01)
(Continued)

(52) U.S. Cl.
CPC .............. *H02P 9/305* (2013.01); *F03B 17/06* (2013.01); *F03D 7/0272* (2013.01); *F03D 9/255* (2017.02);
(Continued)

(58) Field of Classification Search
CPC ........ F03D 15/20; F03D 7/0272; F03D 9/255; F05B 2220/30; F05B 2220/70642;
(Continued)

(56) References Cited

U.S. PATENT DOCUMENTS 2,892,144 A 6/1959 Kober
6,631,080 B2 10/2003 Trimble et al.
(Continued)

FOREIGN PATENT DOCUMENTS

EP 1995868 11/2008
EP 2060786 5/2009

OTHER PUBLICATIONS

The International Search Report dated Mar. 30, 2016, in PCT/US2015/061313, filed Nov. 18, 2015.
(Continued)

*Primary Examiner* — Julio C. Gonzalez
(74) *Attorney, Agent, or Firm* — Hovey Williams LLP

(57) ABSTRACT

An electrical generator (114) and a power electronics interface (115) for a direct-drive turbine (110). The turbine (110) may include a rotor (112) for transforming kinetic (from, e.g., wind, water, steam) into mechanical energy, the generator (114) for transforming the mechanical into electrical energy, and the power electronics interface (115) for conditioning the electrical energy for delivery to a power distribution grid (124). The interface (115) includes a three-phase single-stage boost inverter (120) for converting a lower DC voltage into a higher AC voltage, and which uses a synchronous reactance of the generator (114) as a DC-link inductance. The turbine (110) has neither the gearbox of indirect-drive designs nor the electrolytic capacitor bank of conventional direct-drive designs, while still allowing for a substantially smaller number of generator poles, resulting in reduced size, weight, complexity, and cost.

10 Claims, 3 Drawing Sheets

(51) Int. Cl.

| | |
|---|---|
| *F03D 15/20* | (2016.01) |
| *F03D 7/02* | (2006.01) |
| *H02P 27/06* | (2006.01) |
| *F03D 9/25* | (2016.01) |
| *F03B 17/06* | (2006.01) |
| *H02M 5/458* | (2006.01) |
| *H02M 7/219* | (2006.01) |
| *H02M 7/5387* | (2007.01) |
| *H02P 101/15* | (2016.01) |
| *H02P 101/10* | (2015.01) |
| *H02P 101/20* | (2015.01) |

(52) U.S. Cl.
CPC .......... *F03D 15/20* (2016.05); *H02M 5/4585* (2013.01); *H02M 7/219* (2013.01); *H02M 7/5387* (2013.01); *H02P 27/06* (2013.01); *F05B 2220/30* (2013.01); *F05B 2220/7068* (2013.01); *F05B 2220/70642* (2013.01); *H02P 2101/10* (2015.01); *H02P 2101/15* (2015.01); *H02P 2101/20* (2015.01); *Y02E 10/723* (2013.01); *Y02E 10/725* (2013.01)

(58) Field of Classification Search
CPC ......... F05B 2220/7068; H02M 5/4585; H02M 7/219; H02M 7/5387; H02P 2101/10; H02P 27/06; H02P 9/305; H02P 2101/15; H02P 2101/20
USPC ...................................... 290/44, 55
See application file for complete search history.

(56) References Cited

U.S. PATENT DOCUMENTS

| | | | |
|---|---|---|---|
| 7,015,595 B2 | 3/2006 | Feddersen et al. | |
| 7,333,349 B2 | 2/2008 | Chang et al. | |
| 7,939,970 B1 * | 5/2011 | Walling | F03D 7/0284 |
| | | | 290/44 |
| 8,711,565 B2 | 4/2014 | Wagoner et al. | |
| 8,823,190 B2 | 6/2014 | Wang et al. | |
| 9,780,564 B2 * | 10/2017 | Thompson | H02J 7/35 |
| 2005/0270000 A1 * | 12/2005 | Chang | H02M 7/48 |
| | | | 323/222 |
| 2007/0051712 A1 * | 3/2007 | Kooken | B23K 9/095 |
| | | | 219/130.1 |
| 2010/0283252 A1 | 11/2010 | Fradella | |
| 2012/0026631 A1 | 2/2012 | Kazemi et al. | |
| 2012/0043759 A1 | 2/2012 | Bjork | |
| 2012/0056602 A1 | 3/2012 | Li et al. | |
| 2012/0139350 A1 | 6/2012 | Wang | |
| 2012/0256422 A1 | 10/2012 | Fradella | |
| 2013/0010505 A1 | 1/2013 | Bo et al. | |
| 2013/0057227 A1 | 3/2013 | Aurtenetxea et al. | |
| 2014/0036557 A1 * | 2/2014 | Nondahl | H02M 1/12 |
| | | | 363/71 |
| 2014/0211521 A1 | 7/2014 | Mazumder | |
| 2015/0001848 A1 * | 1/2015 | Imaie | H02P 9/006 |
| | | | 290/44 |
| 2015/0349662 A1 * | 12/2015 | Jiang | H02M 7/5395 |
| | | | 363/71 |
| 2016/0102653 A1 * | 4/2016 | Barton | F03D 7/00 |
| | | | 290/44 |

OTHER PUBLICATIONS

Kaviani, Ali Kashefi "Dynamic Modeling and Analysis of Single-Stage Boost Inverters under Normal and Abnormal Conditions," May 7, 2012, FIU Electronic Theses and Dissertations.
Baji, Shaik "Three Phase Single Stage Boost Inverter With Coupled Inductor for Renewable Energy Sources," International Journal of Engineering Research & Technology, Nov. 2013, vol. 2, Issue 11.
Zhou, Yufei "Single-Stage Boost Inverter With Coupled Inductor," IEEE Transactions on Power Electronics, Apr. 2012, vol. 27, No. 4.
Saghaleini, Mahdi "Switching Patterns and Steady-State Analysis of Grid-Connected and Stand-Alone Single-Stage Boost-Inverters for PV Applications," 2012, FIU Electronic Theses and Dissertations. Paper 796.
Sureshkumar, V. "Three Phase Current Source Inverter Using Space Vector Pwm for Grid Connected Applications," The International Journal of Engineering and Science, 2014, pp. 35-38, vol. 3, Issue 2.
Abdel-Salam, Mazen, "Maximum Power Point Tracking for Variable Speed Grid Connected Small Wind Turbine," 2010 IEEE International Energy Conference.

* cited by examiner

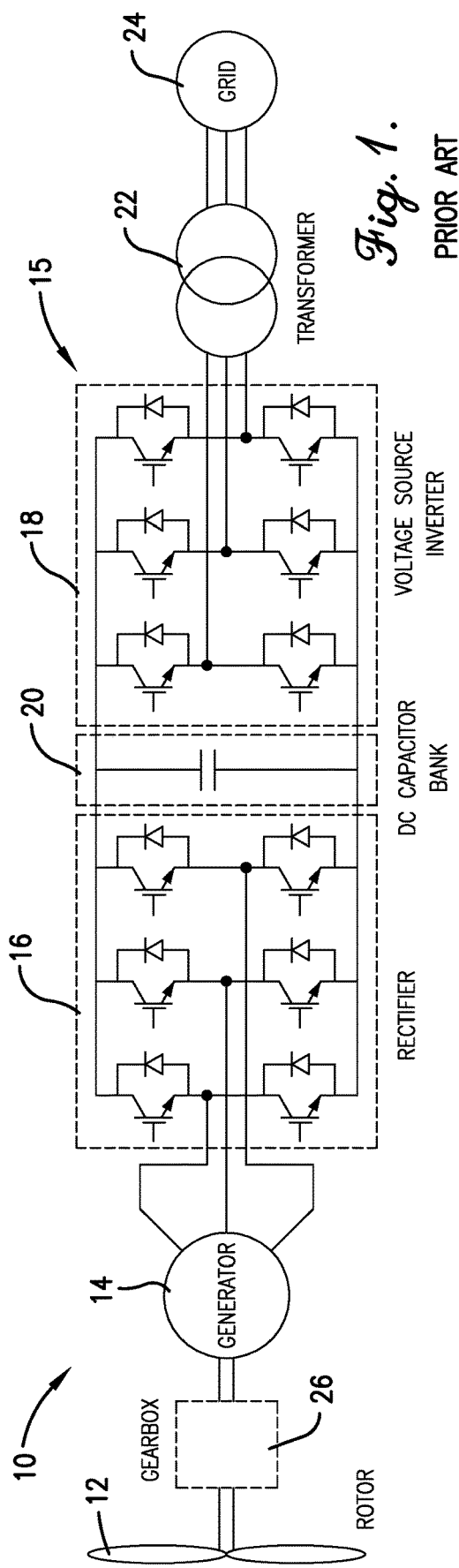
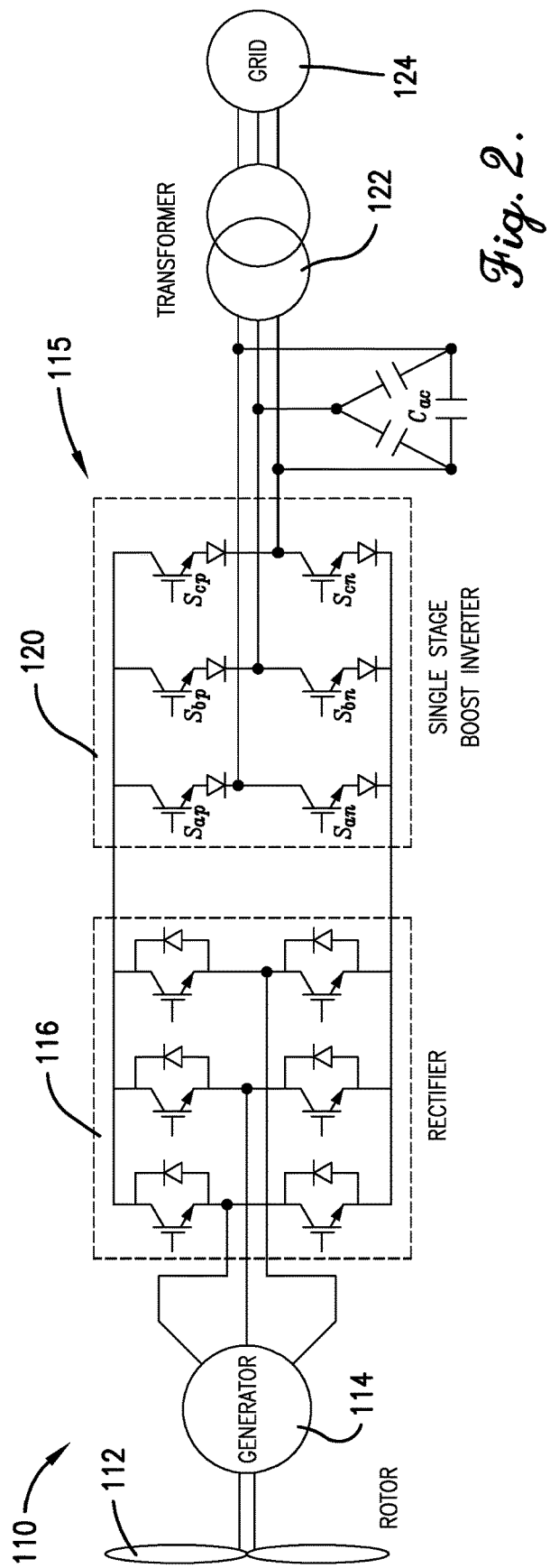

DIRECT-DRIVE WIND TURBINE CIRCUIT TOPOLOGY WITH SINGLE-STAGE BOOST INVERTER

RELATED APPLICATIONS

This is a national stage application under 35 U.S.C. § 371 of International Patent Application No. PCT/US2015/061313, filed Nov. 18, 2015, which claims the priority benefit of a prior-filed U.S. provisional patent application of the same title, Ser. No. 62/081,098, filed Nov. 18, 2014. The identified prior-filed applications are hereby incorporated by reference in their entireties.

BACKGROUND OF THE INVENTION

Field of the Invention

The present invention is broadly concerned with electrical generators and power electronics interfaces for direct-drive turbines.

Description of the Prior Art

Turbines transform kinetic energy from various sources (e.g., wind, water, steam) into electrical energy. For example, a wind turbine comprises a rotor that transforms kinetic energy from wind into mechanical energy, and an electrical generator that transforms the mechanical energy into electrical energy. The output of a grid-connected electrical generator must be synchronized to the fixed frequency of the power grid. In direct-drive wind turbine systems, this connection is accomplished through an AC-to-AC converter consisting of an AC-to-DC converter (rectifier) and a DC-to-AC converter (inverter). This conversion is commonly achieved by first rectifying the electrical generator's output using an AC-to-DC converter, and then using a DC-to-AC inverter to change the rectified DC signal into the desired AC signal at the frequency of the power grid. An electrolytic capacitor bank is placed between the rectifier and the inverter in order to smooth the voltage output of the rectifier. In large turbines, the output of the inverter is a three-phase signal, and for commonly used inverter topologies, the rms value of the line-to-line voltage, $V_{LL}$, of the inverter output for a given input DC voltage, $V_{DC}$, can be found via the equation:

$$V_{LL} = k \ V_{DC}, \text{ where } k<1$$

A transformer is then used to increase this line-to-line voltage so the output can be connected to high voltage transmission lines.

Many turbines have a low speed shaft connected to the rotor, and a high speed shaft connected to the electrical generator. Indirect-drive turbines need a gearbox to convert the high torque, low speed rotational power of the rotor into low torque, high speed power to connect the low speed shaft of the rotor to the high speed shaft of the electrical generator. Direct-drive turbines have no gearbox, and the rotor is directly connected to the generator. Indirect-drive turbines are able to efficiently use conventional generators which are smaller, lighter, and less expensive than the generators used in direct-drive turbines, but the gearboxes create more downtime (i.e., time when the turbine is inoperable) than any other component in an indirect-drive turbine. However, although they are responsible for around 20% of total turbine downtime, gearboxes account for only 10% of turbine failures. This difference is due to the fact that the majority of gearbox failures necessitate an entire gearbox replacement, a feat which requires the use of heavy machinery and significant manpower. Thus, although gearboxes are fairly reliable, the failures that do occur are expensive, both in terms of repair costs and production losses. Efforts have been made to increase the reliability of gearboxes by determining when preventative maintenance is required. However, these efforts often require the use of expensive sensors, and retrofitting existing gearboxes is costly, if it can be done at all. For many turbines, especially those located in remote areas or offshore where maintenance costs are dramatically higher, the ideal solution is to remove the gearbox altogether, but that requires redesigning the generator and power electronics interface.

Various types of generators are used in wind turbines, and each has its own advantages and disadvantages. Permanent magnet (PM) generators are becoming more popular in direct-drive applications because of their high reliability, simple construction, the improving performance of PM materials, and that fact that no power supply is needed to excite the electromagnet. However, many designs for direct-drive wind turbine generators require a high number of poles (e.g. 40 poles), while conventional indirect-drive wind turbine generators use a low number of poles (e.g. 4 or 8 poles). This large increase in the number of poles corresponds to a large increase in the size of the generator, which makes them heavier, more complex, and more expensive than their indirect-drive counterparts. Direct-drive generator designs require so many poles because of constraints imposed by the power electronics interface and the requirement that the output of the generator be within a specific range, which limits the potential for design innovation.

The power electronics interface broadly comprises a rectifier, an inverter, and a capacitor bank employing electrolytic capacitors interposed between the rectifier and the inverter. For direct-drive wind turbines, the power electronics interface is one of the most failure prone components. A primary point of failure is the electrolytic capacitors which can account for over about 60% of failures. Complex methods exist for attempting to determine the remaining lifespan of electrolytic capacitors, but these methods have actually no impacts on their lifespan. Thus, although faults are more predictable using these methods, the DC-bus capacitors is still needed in conventional topologies causing high maintenance costs.

SUMMARY OF THE INVENTION

The present invention overcomes the problems discussed above and provides an improved electrical generator and power electronics interface for use in a direct-drive turbine, wherein the resulting turbine has neither a gearbox nor an electrolytic capacitor bank, and, furthermore, requires a substantially smaller number of poles than prior art electrical generators, resulting in reduced size, weight, complexity, and cost.

In an exemplary embodiment, a direct-drive turbine may broadly comprise a rotor, an electrical generator, and a power electronics interface. The rotor may be configured to transform kinetic energy into mechanical energy. The electrical generator may be configured to transform the mechanical energy from the rotor into electrical energy. The power electronics interface may be configured to condition the electrical energy from the electrical generator for delivery to a power distribution grid, and may include a single-stage boost inverter configured to convert a DC voltage into a relatively higher AC voltage.

Various implementations of the foregoing embodiment may include any one or more of the following additional features. The kinetic energy may be provided by a flowing fluid medium such as a liquid or a gas. The electrical generator may be a permanent magnet electrical generator or a synchronous electrical generator. The single-stage boost inverter may be a three-phase single-stage boost inverter. The single-stage boost inverter may be configured to use a synchronous reactance of the electrical generator as a DC-link inductance. The power electronics interface may not include a bank of electrolytic capacitors interposed between an AC-to-DC converter and a DC-to-AC inverter, as is used in conventional designs.

BRIEF DESCRIPTION OF THE DRAWINGS

FIG. 1 (PRIOR ART) is a high-level schematic of an exemplary wind turbine having a conventional electrical generator and a conventional power electronics interface;

FIG. 2 is a high-level schematic of a wind turbine having embodiments of an electrical generator and a power electronics interface of the present invention;

DETAILED DESCRIPTION OF THE PREFERRED EMBODIMENTS

Figure 3:
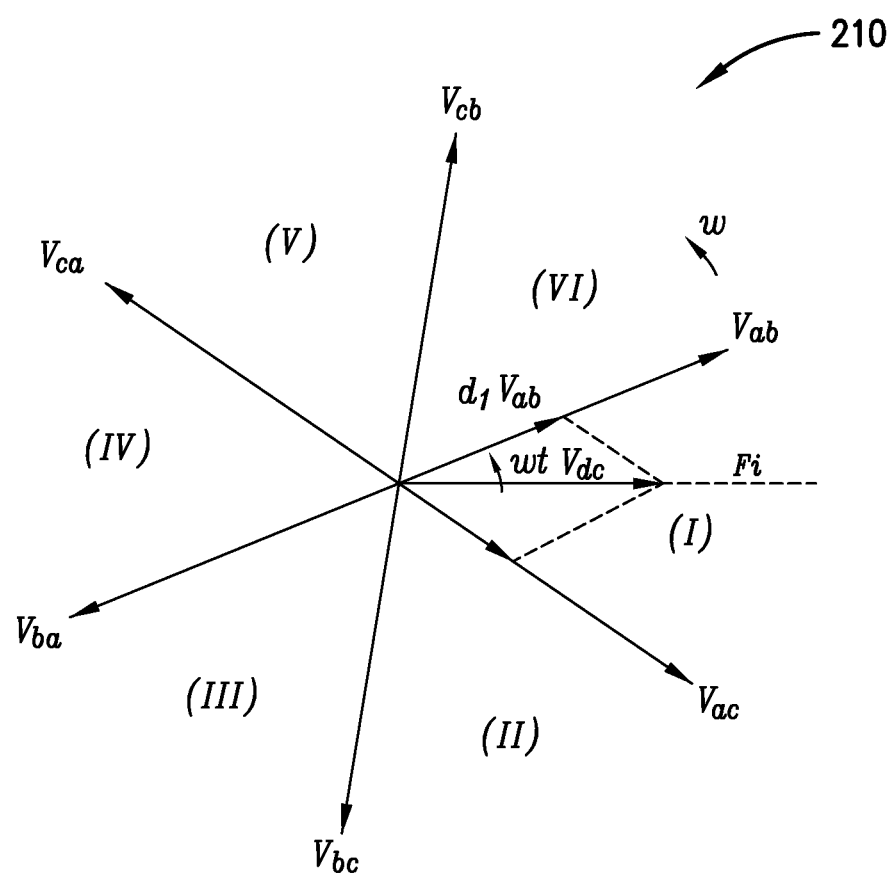
FIG. 3 is a depiction of exemplary line-to-line voltage phasors and their sectors associated with the wind turbine of FIG. 2.

Referring to FIG. 1 (PRIOR ART), an exemplary wind turbine 10 may broadly comprise a rotor 12 for transforming kinetic energy from wind into mechanical energy, and an electrical generator 14 for transforming the mechanical energy into electrical energy. The generator 14 includes a power electronics interface 15 which includes an AC-to-DC converter 16 for rectifying the electrical generator's output, a DC-to-AC inverter 18 for changing the rectified signal into a sinusoid having a desired frequency (e.g., 60 Hz), and an electrolytic capacitor bank 20 interposed between the rectifier 16 and the inverter 18 in order to smooth the voltage output of the rectifier 16. The output of the inverter 18 may be passed through a transformer 22 on its way to a power distribution grid 24. The use of the DC-to-AC inverter 18 to convert a variable frequency AC voltage to a line frequency, three-phase, balanced AC voltage makes it necessary for the electrical generator 14 to produce a specific AC voltage which, when rectified, gives the required DC-bus voltage. This minimum voltage requirement can be satisfied either by using a gearbox 26 to increase the drive speed of the generator 14 or by using a very large generator with a very large number of poles to produce the desired AC output voltage which after rectification can be fed to the inverter 18. Thus, if this is an indirect-drive wind turbine, then the gearbox 26 may be interposed between the rotor 12 and the electrical generator 14. The gearbox 26 allows for using a relatively small, light, simple, and inexpensive generator, but the gearbox 26 is a primary point of failure that can offset the advantages it allows for with regard to the generator. If this is a direct-drive wind turbine, then there is no gearbox and the electrolytic capacitor bank 20 is a primary point of failure, and the electrical generator may require one hundred or more poles, which makes it larger, heavier, more complex, and more expensive than the generator used in the indirect-drive wind turbine.

Broadly characterized, the present invention provides an improved electrical generator and power electronics interface for use in a direct-drive turbine, wherein the resulting turbine has neither a gearbox nor an electrolytic capacitor bank (which, again, are the most failure prone components) and, furthermore, requires a substantially smaller number of poles than prior art electrical generators, resulting in reduced size, weight, complexity, and cost. Referring to FIG. 2, this is accomplished by replacing the DC-to-AC inverter 18 and the electrolytic capacitor bank 20 with a single-stage boost inverter 120. In one embodiment, the number of poles may be reduced to approximately one-fourth or less of the number or poles required by prior art electrical generators. Furthermore, the power electronics interface 115 of the present invention increases overall system reliability and facilitates further innovations in electrical generator design. In particular, the power converter 120 transfers power from a low DC voltage to a much higher three-phase AC voltage. This allows a PM or synchronous generator in a direct-drive wind turbine to produce a lower voltage and a higher current, which adds flexibility to the generator design process and allows designers to be more innovative and use less expensive and more efficient generators.

An operational environment for and embodiment of the present invention are shown in FIG. 2 as broadly comprising, in a direct-drive wind turbine 110, the rotor 112, the electrical generator 114, the power electronics interface 115 including the AC-to-DC converter 116 and the single-stage boost inverter 120, the transformer 122, and the power distribution grid 124. In some embodiments, the rotor 112, the transformer 122, and the power distribution grid 124 may be substantially conventional. Although described herein primarily in the operational context of wind turbines, the electrical generator 114 and power electronics interface 115 of the present invention may also be used with other types of turbines, such as turbines making use of kinetic energy from substantially any flowing fluid mediums (whether liquids or gases), and is not limited to use in wind turbines.

The single-stage boost inverter 120 can use a relatively low DC-bus voltage and does not require an electrolytic capacitor bank at the DC-bus. Thus, the inverter 120 may replace the DC-to-AC inverter 18 and the electrolytic capacitor bank 20 found in prior art power electronic interfaces 15. In one embodiment, the inverter 120 may be a three-phase single-stage boost inverter. FIG. 3 shows a depiction 210 of exemplary line-to-line voltage phasors and their sectors associated with an embodiment of the direct drive turbine 110. The switching pattern for the insulated gate bipolar transistors (IGBTs) of the inverter 120 may include six sectors and nine states (three charging states and six discharging states) with only two switches conducting at any given time. The charging states may boost the DC input voltage. There may be six sectors separated by six-line-to-line voltage phasors Vab, Vba, Vcb, Vca, and Vac. In this illustration, the DC-source, Vdc, is located in Sector (I). In each switching cycle there may be three time-intervals: One time-interval for charging the DC-link inductor, tc, and two time intervals for injecting current into two different phases. In other words, the six main switching states, and two zeros, with three switches conducting at any given instant in conventional space vector PWM (SVPWM) techniques, may be modified to six states with only two switches conducting at any given time, as well as three charging states in PPWM for the single-stage boost inverter 120. PPWM may be been formulated based on the phasor quantities, and not the space-vectors. Thus, there may be three states resulting from the three time-intervals in each switching cycle as follows. State-C may be the charging interval, tc, in which two switches in Leg-A, i.e., Sap and San, are closed and the DC-link inductor is being charged. State-D1 may be the first discharging time-interval in which the inductor current is directed into phases A and B. During this period of time, the upper switch of Leg-A, Sap, and the lower switch of Leg-B, Sbn, of the inverter may be closed. State-D2 may be the second discharging time-interval in which the inductor current may be directed into phases A and C. During this period of time, the upper switch of Leg-A and the lower switch of Leg-C of the inverter may be closed. When used in photovoltaic systems, such a single stage boost inverter requires a DC-link inductor, but as used by the present invention in wind turbines, it may utilize the synchronous reactance of the PM (or synchronous) generator as the DC-link inductance, which advantageously lowers system costs and losses.

In the prior art, the AC three-phase output of the electrical generator 14 is rectified and smoothened by the large electrolytic capacitor bank 20 and then fed as input to the DC-to-AC inverter 18. The output of this inverter 18 is a three-phase signal, and, for this inverter topology, the rms value of the line-to-line voltage of the inverter output for a given input DC voltage can be found via the equation $$V_{LL} = V_{DC}\left(\frac{\sqrt{3}}{2\sqrt{2}}\right)$$

(considering modulation index=1 for the switching of the inverter 18).

For example, if a 600 V L-Lrms voltage is desired at the inverter output, then the DC-bus voltage must be approximately 980 V. In order to have 980 V at the DC-bus line, the line-to-line rms voltage to be rectified must be approximately 725 VL-Lrms. Thus, the electrical generator 14 must produce approximately 725 V L-Lrms to have 600 V LLrms output from the inverter 18. Using the single-stage boost inverter 120, the same 600 VL-Lrms can be generated by the inverter 120 with a DC-bus voltage of 150 V, which in turn can be obtained from 110 VL-Lrms from the electrical generator 114. Thus, the single-stage boost inverter 120 of the present invention allows for reducing the generator output voltage by almost one-sixth (or less) of that required when using the DC-to-AC inverter 18. In turn, this allows for producing a smaller electrical generator with a fewer number of poles.

Figure 4:
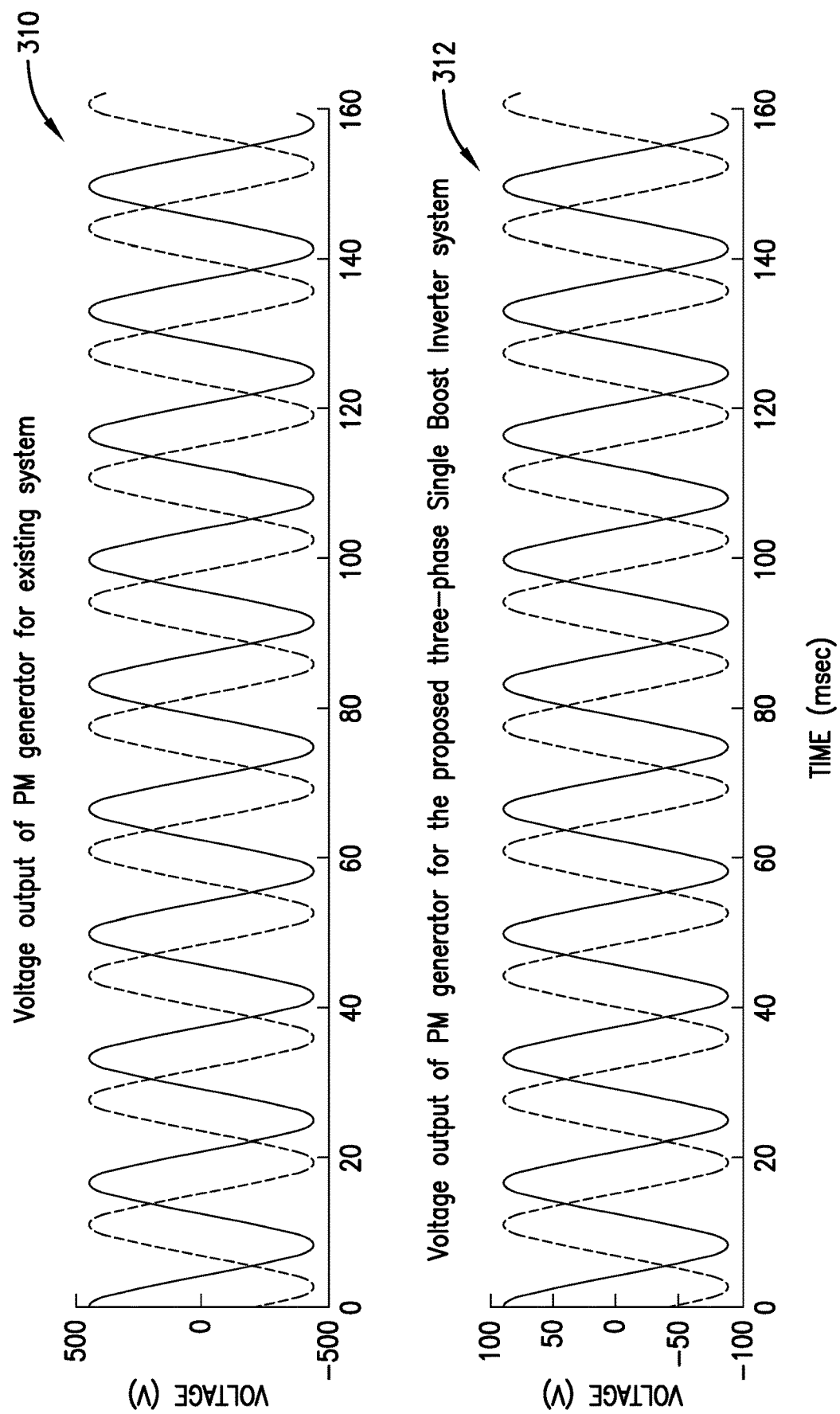
FIG. 4 shows voltage plots for the electrical generators of FIGS. 1 and 2 for comparison.

FIG. 4 shows a comparison of the output voltage 310 required from a conventional system using a conventional electrical generator 14 and the output voltage 312 from an embodiment of an electrical generator 114 of the present invention for the same power delivered to the load. For this comparison, an output voltage of 208 $V_{L-Lrms}$ was generated at the inverter output of both systems which is feeding a three-phase balanced resistive load of 70 Ω/phase. The voltage output of the electrical generator 14 for the prior art system (312 $V_{L-Lrms}$, in this case) is more than four times higher than the voltage output of the electrical generator 114 of the present invention (67 $V_{L-Lrms}$, in this case).

For an electrical generator, E=4.44KØfN, where frequency can be written as:

$$f = \frac{n_{rpm}P}{120}$$

where P is the total number of poles. Thus, $$E = \frac{4.44\ K\phi N n_{rpm} P}{120}$$

For the electrical generator used for both cases, $$4.44\ K\phi \frac{N}{120} = \text{constant}$$

and $n_{rpm}$ is dependent on the wind speed, i.e., $$4.44\ K\phi \frac{N n_{rpm}}{120} = \text{constant ``}C\text{''}$$

where φ is the flux per pole. Therefore, E=CP. So in order to increase the voltage generated by the electrical generator, a higher pole surface is required. However, an electrical generator 114 coupled with the single-stage boost inverter 120 of the present invention requires less pole surface required by the prior art electrical generator 14 coupled with a voltage source inverter.

Thus, embodiments of the present invention advantageously allow for, in turbines, eliminating primary points of failure, lowering preventative and actual maintenance costs, reducing downtime, and designing electrical generators that are smaller, lighter, less complex, and less expensive, and generally facilitating greater innovation in generator design.

Although the invention has been described with reference to the one or more embodiments illustrated in the figures, it is understood that equivalents may be employed and substitutions made herein without departing from the scope of the invention as recited in the claims.

I claim:

1. A direct-drive turbine comprising:
   a rotor configured to transform kinetic energy into mechanical energy;
   an electrical generator configured to transform the mechanical energy from the rotor into electrical energy; and
   a power electronics interface configured to condition the electrical energy from the electrical generator for delivery to a power distribution grid, the power electronics interface including an AC-to-DC converter configured to receive and rectify the electrical energy from the electrical generator, and a DC-to-AC boost inverter configured to receive the electrical energy from the AC-to-DC converter and convert a DC voltage into a relatively higher AC voltage, wherein the DC-to-AC boost inverter is configured to use a synchronous reactance of the electrical generator as a DC-link inductance, and wherein there is no capacitor and no inductor within or between the AC-to-DC converter and the DC-to-AC boost inverter.

2. The direct-drive turbine as set forth in claim 1, wherein the kinetic energy is provided by a flowing fluid medium selected from the group consisting of: liquids and gases.

3. The direct-drive turbine as set forth in claim 1, wherein the electrical generator is a permanent magnet electrical generator.

4. The direct-drive turbine as set forth in claim 1, wherein the electrical generator is a synchronous electrical generator.

5. A direct-drive turbine comprising:
a rotor configured to transform kinetic energy into mechanical energy;
a permanent magnet or synchronous electrical generator configured to transform the mechanical energy from the rotor into electrical energy; and
a power electronics interface configured to condition the electrical energy from the electrical generator for delivery to a power distribution grid, the power electronics interface including an AC-to-DC converter configured to receive and rectify the electrical energy from the electrical generator, and a DC-to-AC boost inverter configured to receive the electrical energy from the AC-to-DC converter and convert a DC voltage into a relatively higher AC voltage and to use a synchronous reactance of the permanent magnet or synchronous electrical generator as a DC-link inductance, wherein there is no capacitor and no inductor within or between the AC-to-DC converter and the DC-to-AC boost inverter.

6. The direct-drive turbine as set forth in claim 5, wherein the kinetic energy is provided by a flowing fluid medium selected from the group consisting of: liquids and gases.

7. In a direct-drive turbine having a rotor configured to transform kinetic energy into mechanical energy, an electrical generator configured to transform the mechanical energy from the rotor into electrical energy, and a power electronics interface configured to condition the electrical energy from the electrical generator for delivery to a power distribution grid, the improvement comprising:
the power electronics interface including an AC-to-DC converter configured to receive and rectify the electrical energy from the electrical generator, and a DC-to-AC boost inverter configured to receive the electrical energy from the AC-to-DC converter and convert a DC voltage into a relatively higher AC voltage, wherein the DC-to-AC boost inverter is configured to use a synchronous reactance of the electrical generator as a DC-link inductance, and wherein there is no capacitor and no inductor within or between the AC-to-DC converter and the DC-to-AC boost inverter.

8. The direct-drive turbine as set forth in claim 7, wherein the kinetic energy is provided by a flowing fluid medium selected from the group consisting of: liquids and gases.

9. The direct-drive turbine as set forth in claim 7, wherein the electrical generator is a permanent magnet electrical generator.

10. The direct-drive turbine as set forth in claim 7, wherein the electrical generator is a synchronous electrical generator.

* * * * *